Dec. 8, 1936.  M. GORDON  2,063,429
HOSE SUPPORTER
Filed May 1, 1934  2 Sheets-Sheet 1

INVENTOR.
Moses Gordon
BY
ATTORNEY.

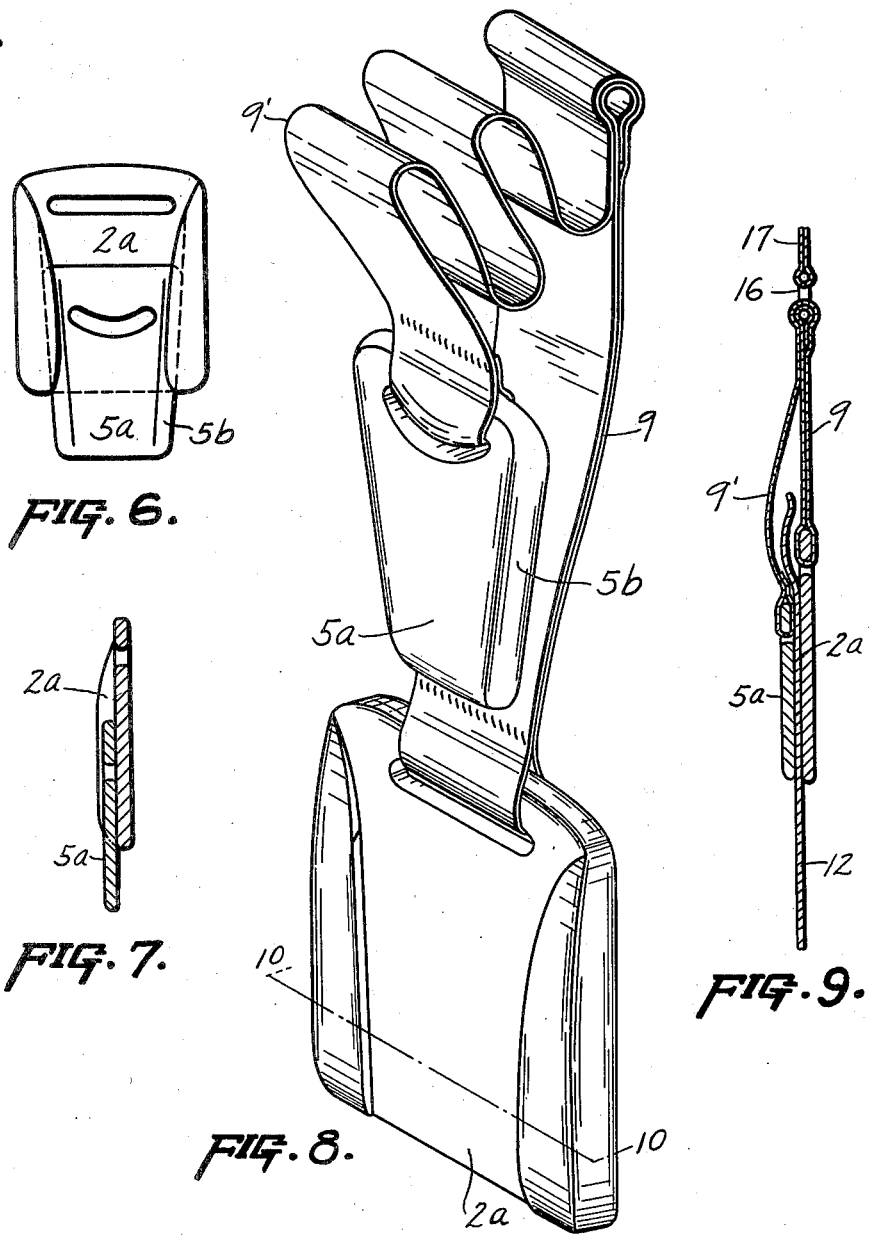

Patented Dec. 8, 1936

2,063,429

UNITED STATES PATENT OFFICE 2,063,429

HOSE SUPPORTER

Moses Gordon, Cincinnati, Ohio, assignor of one-half to Morris Gordon, Cincinnati, Ohio Application May 1, 1934, Serial No. 723,370

15 Claims. (Cl. 24—264)

The object of my invention is to provide a sanitary hose supporter possessing the characteristics of efficiency, durability, simplicity, compactness, being perfectly flat without projections or protuberances of any kind, economy in construction and use, convenience and ease in applying and removing, and adaptability to come into contact with the body of the wearer without any unpleasant or objectionable effects, such as scratching or chafing the skin, and without the possibility of rusting or corroding.

My invention consists in providing a clasp or fastener comprising a base or female member, and a clamping or male member, each suitably mounted and adapted to cooperate with the other in clamping or clasping the object to be supported or held.

More specifically, my invention consists in providing a hose supporter having the parts which come into contact with the body made of material that will not rust or corrode, the clasp or clamping elements consisting of a plastic substance which preferably possesses sufficient flexibility whereby it will yield to accommodate itself to any sudden strain, thus preventing the tearing or otherwise damaging of the hose, and comprises a material in the nature of cellulose acetate, celluloid, ivory, bone, hard rubber, bakelite, plaskon, tenite, cellulose nitrate, or any other similar non-metallic, non-rustable and non-corrodible material which is free from any cold effect or other unpleasant sensation to the user such as is the case with metal.

My invention also consists in such material, and in the peculiar construction, combination, location and arrangement of parts, in combination with fabric and other material to which it is attached, as herein set forth and claimed.

In other forms of a hose supporter of this general type, the hose was clasped by means of grooves of uniform longitudinal dimensions and a wedge with tapering edges which resulted in the hose being impinged in the grooves on each side. This meant that the hose was clasped securely at only two points while that portion under the flat surface of the wedge was less firmly held. Any additional strain on the hose was liable to tear the material, particularly so since the elements that made up the clasp were of metal.

In my preferred form of invention the male and female members are firmly held in a clamped position throughout the entire adjacent flat surface of the wedge and groove, respectively, as well as between the flanges and the lateral edges of the wedge, thus forming a clamping and holding engagement of the material throughout the largest possible area. Furthermore, since the clamping elements are made of a non-metallic, somewhat flexible substance, there is less danger of tearing, wearing, or cutting the material that is interposed between them.

An advantage of this invention over all others of a similar nature is that, due to the flexibility of the clamping elements, the wedge member can be inserted laterally or sidewise into position within the groove when the stocking or hose is placed upon the grooved or female base, and this is a very convenient and easy method of combining these parts.

Another and very important advantage of my invention over prior hose supporters, consists in providing a base member having an open-ended, tapering, undercut angular groove adapted to receive a portion of the stocking to be supported and clamped by means of a tapering wedge having slightly convex beveled edges which are adapted to form a firm wedging contact with the material and the undercut groove, whereby effective holding engagement is produced and whereby the hose is not damaged by frequent fastening and unfastening of the supporter, and this advantage is particularly accentuated by reason of the fact that the clamping elements are made of the materials mentioned instead of metal, which latter has a shearing and cutting effect and will soon wear and cut holes in the hose thereby producing runners.

The base or female member is constructed of the material specified, with a flat undersurface and a longitudinal angular groove extending from end to end upon its upper surface with a transverse slot through its upper end portion to form an attaching bar for the fabric which connects it to supporting means. The wedge member is constructed of the same material as the base or female member and is formed flat upon its upper and lower surfaces and tapers from its upper end having a curved slot disposed transversely thereof near said upper end and having slightly convex beveled edges adapted to form contact with the garment beneath the inwardly projecting flanges forming the undercut angular groove, whereby said garment is firmly held and supported in proper position upon the wearer.

The construction of the clamping elements is such that the wedge member is adapted to be inserted at the upper end of the female member and slid downwardly therein until the lower end of said wedge member projects a considerable distance beyond the lower end of the female member when no garment is interposed therebetween, and when a hose of considerable thickness is inserted in the groove and clamped therein by the wedge, the wedge can only be slid down a short distance or to a distance whereby the ends of the clamping members terminate at about the same point, but when thinner material is used in the hose the wedge member, before the hose is sufficiently clamped, will be pushed down in the groove until its lower end is considerably below the lower end of the female member. This construction is for the purpose of adapting the clamp to an unlimited variety of thicknesses of material to be clamped so that it is unnecessary to make these clamping elements of different sizes to clamp different thicknesses of material. These clamping elements are so made that they will clamp any thickness of material which is likely to be worn. Furthermore, this construction, whereby the wedge is shifted downwardly longitudinally of the female member, is such that after the wedge is clamped therein upon the material, if there is any additional strain thereafter between the garment and clasp, the wedge will automatically shift downwardly as such strain occurs and continue to tightly clamp, hold and support the garment.

In the drawings:

Fig. 6 shows a modified form of the clamping elements in assembled relation;

Fig. 7 is a central vertical section thereof;

Fig. 8 is a view of this form of clamping elements in separated position and connected to the supporting ribbons;

Fig. 9 is a vertical section showing the clamping elements embracing and supporting the upper portion of a hose, and showing the supporting ribbons and their attachment to a supporting link;

Fig. 10 is a transverse section on the line 10—10 of Fig. 8 showing the male and female elements in clamping position with the fabric held therebetween.

Figure 1:
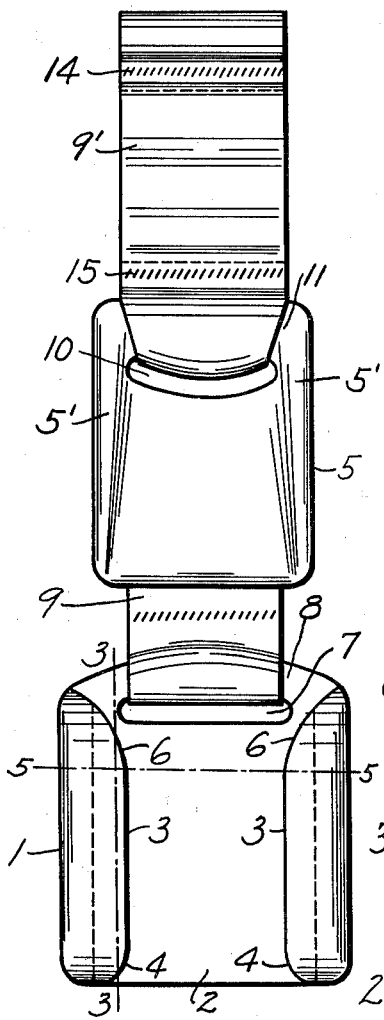
Fig. 1 is a front view of the preferred form of my hose supporters comprising the clamping elements in separated position, each suitably connected to an attaching ribbon.
Figures 2, 3:
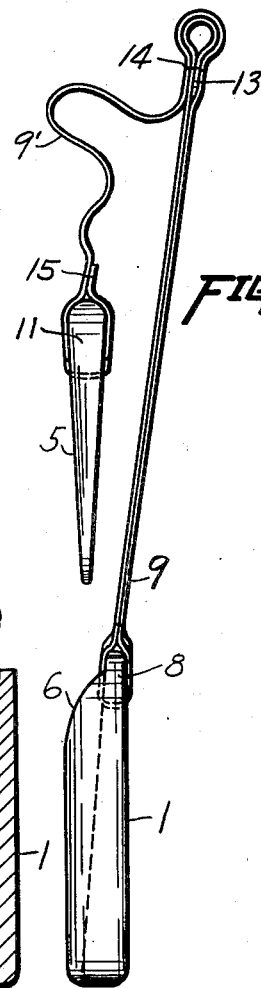
Fig. 2 is an edge elevation of the same.
Fig. 3 is a vertical section on the line 3—3 of Fig. 1, showing, by broken lines, one position the wedge member assumes when inserted therein.
Figure 4:
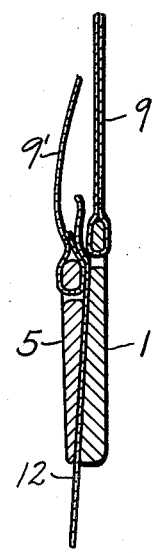
Fig. 4 is a vertical section through the clamping elements and a portion of the supporting ribbons, showing the top portion of a hose clamped between said elements.
Figure 5:
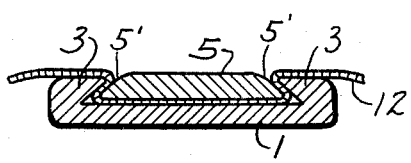
Fig. 5 is a transverse section on the line 5—5 of Fig. 1 of the clamping elements with a piece of material, such as hose fabric, clamped therebetween.

In the embodiment of my invention as illustrated, I prefer to construct the same as shown in Figs. 1 to 5 inclusive, in which the female or base member 1 is provided with an undercut groove 2, forming parallel side flanges 3, each curved at 4 to prevent any snagging, catching, or cutting of the hose fabric when the wedge member 5 is being inserted therein or when there is some slight frictional movement of the parts in use on the wearer; and said flanges are curved at 6 for the same purpose, and also to enable the wedge member to be more readily inserted laterally in the undercut groove upon the hose 12 before sliding it lengthwise in fully clamped position relative to said female member. I also provide a transverse slot 7 near the upper end of the female member, whereby an attaching bar 8 is formed to which a supporting ribbon 9 is connected. Said supporting ribbon is preferably formed double with stiffening material interposed and stitched therebetween above the clamping element for the purpose of easily sliding the female member under the hose 12 in proper position for clamping. The undercut groove 2 is preferably formed angular at 2′ beneath side flange 3, as clearly shown in Fig. 5. It will be noticed by reference to Fig. 3, that the undercut portion 2′ of the groove, beneath the flange 3, tapers longitudinally from its attaching to its free end, and that the wedge member 5 tapers from its attached to its free end, so that when inserted in the undercut groove 2, as shown in Figs. 3 and 4, any downward pull on the hose or upward pull on the clamping elements will tend to still further wedge the hose material therebetween and, more important, the wedging of the material, due to the longitudinally tapering grooves and wedge, will form a firm clamping hold upon the material throughout the entire engaging surface thereof with the clamping elements.

The wedge member 5 has substantially parallel convex beveled edges 5′ adapted to engage in the grooves 2′ beneath flanges 3 of the female member 1. Near the upper end of wedge 5 I provide an arc-shaped slot 10 adapted to form an attaching bar 11 to receive the anchoring ribbon 9′ to which the wedge member is attached ready for convenient use and prevented from being lost. The slot is formed arc-shaped to provide sufficient space to receive the ribbon and at the same time afford adequate strength in the construction of the wedge member, said ribbon being a continuation of ribbon 9 and of the same width. The arrangement of this ribbon is best shown in Fig. 2. Starting at its end 13, it forms a loop and extends downwardly around bar 8, thence upwardly around said loop, and is stitched at 14. It then continues as anchoring ribbon 9′ which is secured around the bar 11 and stitched at 15.

When it is desired to use the clamping elements, clasp the supporting ribbon 9 between the thumb and finger and place the female clamping element 2 beneath the upper portion of the hose 12; then, with the other hand, place the wedge member in position on the hose at the upper end of the female member, giving said wedge member a slight lateral thrust which brings it within the undercut groove, when it is slid down longitudinally into clamping engagement with the hose and female member. In doing this, the user may take hold of the anchoring ribbon 9′, or may take hold of the wedge member itself. To release the wedge clamping member, merely push upwardly on its lower end or pull upwardly on the anchoring ribbon.

In the modified construction illustrated in Figs. 6 to 10 inclusive, the construction of the various parts is substantially the same as in Figs. 1 to 5 inclusive except that the undercut groove 2a tapers laterally from its upper to its lower end; i. e. is narrower at its free end than at its attaching end, and the wedge member 5a is also provided with tapering longitudinal edges 5b. Additionally the form shown in Figs. 6 to 10 illustrates the body portion of both the male and female members as of uniform thickness instead of varying thickness since the lateral wedge formation of these parts will perform the same function as the varying thickness wedge formation of Figs. 1 to 5. In Fig. 9 I have shown how the ribbons are attached to link 16 to which an elastic 17 is connected for attachment to the garments of the wearer.

As will be seen by referring to Figs. 6 and 7, the wedge 5a is constructed so that it can slide down below the lower end of the female member, as an added measure of safety in protecting the hose; i. e. when the wedge is pushed down into clamping position it will hold the hose firmly without any danger of becoming disengaged, and should there be any additional strain on the hose due to the changing positions of the wearer the wedge will automatically slide down still further without injury to the hose itself.

In the construction shown in Figs. 1 to 5 inclusive, as well as in Figs. 6 to 10 inclusive, the wedge member is adapted to engage the undercut walls of the cooperating groove of the female member and to be moved downwardly into said groove until its lower end projects beyond the lower end of said female member, provided the material wedged therebetween is not too thick to prevent the wedge being moved that far.

An advantage of my construction and arrangement of clamping elements is that the wedge remains in the undercut groove under all conditions until pulled out by the wearer.

My invention is capable of some modification without material departure from its scope or spirit as defined in the claims.

What I claim as new and desire to secure by Letters Patent is:

1. In a hose supporter, clamping elements comprising a female member provided with a flat under surface terminating along its longitudinal edges in parallel undercut grooves which form flanges thereover and which grooves decrease in thickness from the attached to the free end of said female member, in combination with a flat male member decreasing in thickness from its attached to its free end and adapted to have its longitudinal edges engage beneath said flanges, said members having their respective flanges and edges normally spaced from one another to receive material therebetween so that when said members are pushed longitudinally of each other in the direction of the decreasing thickness of the grooves they will securely clamp material therebetween.

2. In a hose supporter, clamping elements comprising a female member provided with a flat under surface terminating along its longitudinal edges in parallel undercut grooves which form flanges thereover and which grooves taper both laterally and longitudinally, in combination with a flat male member which decreases in thickness from its attached to its free end and having lateral edges adapted to normally underlie the flanges with a space therebetween to receive material, said edges forming clamping engagement with said grooves and causing the material therebetween to be firmly clamped throughout the entire engaging surface of said material with said clamping elements.

3. In a hose supporter, clamping elements comprising a female member provided with a flat under surface terminating along its longitudinal edges in parallel undercut grooves which form flanges thereover and which grooves decrease in thickness from the attached to the free end of said female member, in combination with a flat male member decreasing in thickness from its attached to its free end and having longitudinal convex edges disposed beneath said flanges to provide a space to receive material so that when said members are moved longitudinally of each other in the direction of the decreasing thickness of the grooves, they will firmly engage the material therebetween throughout the entire material-engaging surfaces of said female and male wedge members, respectively.

4. In a hose supporter, clamping elements composed of cellulose acetate, said elements comprising a base member having substantially flat upper and lower surfaces and having on its upper side extending entirely thereacross from end to end a groove flanked by sides having downwardly inclined plane surfaces, in combination with a tongue comprising a substantially flat member having a cross sectional configuration substantially similar to the cross section of the groove and having the beveled edges thereof convexed, the tongue having a width less than the width of the groove to provide space for the hose and whereby a hose is firmly held and supported between the plane surfaces of the sides of the groove and the convexed edges of the tongue upon relative movement of the clamping elements.

5. In a hose supporter, clamping elements composed of cellulose acetate, said elements comprising a base member having substantially flat upper and lower surfaces and having on its upper side extending entirely thereacross from end to end a groove flanked by sides having downwardly inclined plane surfaces, in combination with a tongue comprising a substantially flat member having a cross sectional configuration substantially similar to the cross section of the groove, the tongue having a width less than the width of the groove to provide space for the hose and whereby said hose is firmly held and supported between the beveled edges of the tongue and the inclined plane surfaces of the groove sides upon relative movement of the clamping elements.

6. In a hose supporter, clamping elements comprising a female member provided with a flat reduced surface upon one side and having parallel undercut grooves along each side edge of said flat surface, said grooves gradually decreasing in size from the attached to the free end of said female member, in combination with a male member tapering in thickness from its attached end to its free end and adapted to underlie said flanges with a space between them to receive material so that when actuated axially relative to each other in the direction of the decreasing thickness of the grooves, said elements will securely clamp material therebetween.

7. In a hose supporter, clamping elements comprising a female member provided with a flat side surface terminating along its longitudinal edges in undercut grooves which form flanges thereover and which grooves decrease in thickness from the attached to the free end of said female member, in combination with a flat male member decreasing in thickness from its attached to its free end and having longitudinal beveled edges spacedly disposed beneath said flanges to receive material so that when said members are actuated axially relative to each other in the direction of the decreasing thickness of the grooves they will firmly engage the material therebetween throughout the entire material-engaging surfaces of said female and male wedge members, respectively.

8. In a hose supporter, clamping elements comprising a female member provided with a flat side surface terminating along its longitudinal edges in undercut grooves which form flanges thereover and which grooves decrease in thickness from the attached to the free end of said female member, in combination with a flat male member decreasing in thickness from its attached to its free end and having longitudinal edges spacedly disposed beneath said flanges to receive material so that when said members are actuated axially relative to each other in the direction of the decreasing thickness of the grooves they will firmly engage the material therebetween throughout the entire material-engaging surfaces of said female and male wedge members respectively.

9. In a hose supporter, clamping elements comprising a female member provided with a flat side surface terminating along its longitudinal edges in undercut grooves which form flanges thereover and which grooves decrease in thickness from the attached to the free end of said female member, in combination with a flat male member decreasing in thickness from its attached to its free end and having longitudinal convex beveled edges spacedly disposed beneath said flanges to receive material so that when said members are actuated axially relative to each other in the direction of the decreasing thickness of the grooves they will firmly engage the material therebetween throughout the entire material-engaging surfaces of said female and male wedge members respectively.

10. In a hose supporter, clamping elements comprising a female member having a body or base portion increasing in thickness from its attached to its free end and having an undercut groove along each side of said member, in combination with a male wedge member decreasing in thickness from its attached to its free end and having beveled edges freely disposed in said groove to provide space for material around said edges within the groove whereby said wedge is, upon movement in the direction of the increasing thickness of the female member adapted to securely clamp material between it and said female member.

11. In a hose supporter, clamping elements comprising a female member having inwardly projecting parallel side flanges, each forming a groove between it and the body of the female member which gradually diminishes in size from the attached to the free end of said female member, the upper surface of said flanges and the bottom surface of the female member being parallel throughout their length and breadth, in combination with a male wedge member adapted to have its edges spacedly disposed beneath said flanges in said grooves respectively, whereby material may be received within said groove around said edges and may be securely clamped between said members upon relative movement thereof in the direction of gradual diminishment of the groove.

12. In a supporter of the class described the combination of a first clamping member adapted to be disposed beneath the fabric or garment to be clamped thereby and having a dovetailed groove formed longitudinally thereof with the base and upwardly inwardly inclining surfaces of said groove presenting plane faces, and a second clamping member adapted to enter the dovetailed groove in the first clamping member and having a bottom and sides conforming to the general outline of the dovetailed groove, said second clamping member being of a width less than the width of the groove to provide a space for material reception, and said sides of the second clamping member being provided with convexed surfaces which cooperate in clamping the material in the dovetailed groove between the clamping members upon relative movement thereof.

13. A hose supporting fastener comprising a base member having a flat bottom surface and having an upstanding flange along each side of the base member, said flanges having their opposed faces receding from one another to provide an undercut groove extending from one end to the other of the base member, said groove being open at both ends and adapted to receive therein a portion of the hose, the top surface of each flange being in a given plane which is parallel with the plane of the bottom surface of the base member, in combination with a tapering wedge having beveled side wedges throughout its length and a plane top surface, said side edges of the tapering wedge being normally spaced beneath the groove flanges to provide space for the hose, said wedge being adapted to compress the hose between its beveled edges and the receding faces of said base member flanges when the wedge and base member are actuated in opposite directions, and when in said clamped position having the top surface of the flanges and wedge in the same plane.

14. A hose supporting fastener comprising a base member having a flat bottom surface and having an upstanding flange along each side of the base member, said flanges having their opposed faces receding from one another to provide an undercut groove extending from one end to the other of the base member, said groove being open at both ends and adapted to receive therein a portion of the hose, the top surface of each flange being in a given plane which is parallel with the plane of the bottom surface of the base member, in combination with a tapering wedge having beveled side edges throughout its length and a plane top surface, said side edges of the tapering wedge being normally spaced beneath the groove flanges to provide space for the hose, said wedge being adapted to compress the hose between its beveled edges and the receding faces of said base member flanges when the wedge and base member are actuated in opposite directions, and when in said clamped position having the top surfaces of the flanges and wedge in the same plane, said base member flanges being cut away at one end of the groove to provide a flaring entrant portion to said groove to facilitate the insertion therein of the wedge when the hose is in position on the base member.

15. A hose supporting fastener comprising a base member having a flat bottom surface and having an upstanding flange along each side of the base member, said flanges having their opposed faces receding from one another to provide an undercut groove extending from one end to the other of the base member, said groove being open at both ends and adapted to receive therein a portion of the hose, the top surface of each flange being in a given plane which is parallel with the plane of the bottom surface of the base member, in combination with a tapering wedge having beveled side edges throughout its length and a plane top surface, said side edges of the tapering wedge being normally spaced beneath the groove flanges to provide space for the hose, said wedge being adapted to compress the hose between its beveled edges and the receding faces of said base member flanges when the wedge and base member are actuated in opposite directions, and when in said clamped position having the top surface of the flanges and wedge in the same plane, said base member flanges being cut away at one end of the groove to provide a flaring entrant portion to said groove to facilitate the insertion therein of the wedge when the hose is in position on the base member, the base member and wedge each having formed at one end thereof a supporting bar, and a tape secured to each bar and having their opposite ends secured to one another, said tapes being of unequal length whereby one of them carries the strain during the use of the supporting fastener.

MOSES GORDON.